United States Patent
Hagiya et al.

(10) Patent No.: US 11,152,024 B1
(45) Date of Patent: Oct. 19, 2021

(54) PIEZOELECTRIC-BASED MICROACTUATOR ARRANGEMENT FOR MITIGATING OUT-OF-PLANE FORCE AND PHASE VARIATION OF FLEXURE VIBRATION

(71) Applicant: Western Digital Technologies, Inc., San Jose, CA (US)

(72) Inventors: Shinobu Hagiya, Fujisawa (JP); Hiroyasu Tsuchida, Fujisawa (JP); Tzong-Shii Pan, Santa Clara, CA (US); Haruki Nitta, Machida (JP); Yoshinobu Noguchi, Yokohama (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/835,016

(22) Filed: Mar. 30, 2020

(51) Int. Cl.
*G11B 5/48* (2006.01)
*G11B 5/55* (2006.01)

(52) U.S. Cl.
CPC .......... *G11B 5/4873* (2013.01); *G11B 5/483* (2015.09); *G11B 5/5552* (2013.01)

(58) Field of Classification Search
None
See application file for complete search history.

(56) References Cited

U.S. PATENT DOCUMENTS

| | | | |
|---|---|---|---|
| 6,414,569 B1 * | 7/2002 | Nakafuku | H03H 3/04 29/25.35 |
| 6,614,613 B1 | 9/2003 | Huang et al. | |
| 6,680,826 B2 | 1/2004 | Shiraishi et al. | |
| 7,522,018 B2 * | 4/2009 | Milsom | H03H 9/02149 310/312 |
| 8,134,809 B2 | 3/2012 | Yao et al. | |
| 9,330,694 B1 | 5/2016 | Hahn et al. | |

(Continued)

FOREIGN PATENT DOCUMENTS

| EP | 2800095 A1 | 5/2014 |
|---|---|---|
| JP | 02062084 A * | 3/1990 |

(Continued)

OTHER PUBLICATIONS

Chan, Kwong Wah et al., Precision Positioning of Hard Disk Drives Using Piezoelectric Actuators with Passive Damping, Proceedings of the 2006 IEEE, International Conference on Mechatronics and Automation, Jun. 25-28, 2006, pp. 1269-1274, IEEE, Luoyang China, downloaded from https://www.semanticscholar.org/paper/Precision-Positioning-of-Hard-Disk-Drives-Using-Chan-Liao/64c70e0130c7ebfa83547fbb34e339b2534fca22.

(Continued)

*Primary Examiner* — William J Klimowicz
(74) *Attorney, Agent, or Firm* — John D. Henkhaus (57) ABSTRACT

An approach to a piezoelectric (PZT) device, such as a hard disk drive microactuator, includes one or more layers of poled PZT material, with top and bottom surfaces coupled with respective electrode layers coupled with a power source to drive the active PZT layer(s). The electrode layers have different thicknesses, where the particular thicknesses may be configured to mitigate the variation of out-of-plane motion or bending associated with operational variations in the z-height between a corresponding actuator arm and recording medium and, likewise, the phase variation of flexure vibration.

18 Claims, 7 Drawing Sheets

(56) References Cited

U.S. PATENT DOCUMENTS

| | | | |
|---|---|---|---|
| 9,741,376 B1 | 8/2017 | Ee et al. | |
| 9,818,927 B2* | 11/2017 | Maruyama | H01L 41/314 |
| 10,325,621 B1 | 6/2019 | Hahn et al. | |
| 2006/0152112 A1* | 7/2006 | Sasaki | H01L 41/083 |
| | | | 310/331 |
| 2006/0220763 A1* | 10/2006 | Iwasaki | H03H 9/02157 |
| | | | 333/133 |
| 2009/0080119 A1* | 3/2009 | Kurihara | G11B 5/6005 |
| | | | 360/313 |
| 2017/0117825 A1 | 4/2017 | Jourdan et al. | |
| 2018/0138886 A1* | 5/2018 | Yoon | H01L 41/1136 |
| 2019/0228796 A1 | 7/2019 | Ee et al. | |
| 2020/0091404 A1 | 3/2020 | Zhang et al. | |
| 2020/0207092 A1* | 7/2020 | Hirai | H01L 41/0805 |

FOREIGN PATENT DOCUMENTS

| | | | |
|---|---|---|---|
| JP | 2001339966 A | * | 12/2001 |
| JP | 2005064689 A | * | 3/2005 |
| JP | 2019041048 A | * | 3/2019 |
| JP | 5890856 B2 | | 1/2020 |

OTHER PUBLICATIONS

Israel Patent Office (ISA/IL), PCT International Search Report and Written Opinion for counterpart International application No. PCT/US2020/037820, dated Nov. 9, 2020, 9 pages.

* cited by examiner

FIG. 7

PIEZOELECTRIC-BASED MICROACTUATOR ARRANGEMENT FOR MITIGATING OUT-OF-PLANE FORCE AND PHASE VARIATION OF FLEXURE VIBRATION

FIELD OF EMBODIMENTS

Embodiments of the invention may relate generally to hard disk drives and particularly to a piezoelectric (PZT) microactuator.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates.

Increasing areal density (a measure of the quantity of information bits that can be stored on a given area of disk surface) has led to the necessary development and implementation of secondary and even tertiary actuators for improved head positioning through relatively fine positioning, in addition to a primary voice coil motor (VCM) actuator which provides relatively coarse positioning. Some HDDs employ micro- or milli-actuator designs to provide second and/or third stage actuation of the recording head to enable more accurate positioning of the head relative to the recording tracks. Milli-actuators are broadly classified as actuators that move the entire front end of the suspension: spring, load beam, flexure and slider, and are typically used as second stage actuators. Micro-actuators (or "microactuators") are typically used as third stage actuators and are broadly classified as actuators that move (e.g., rotate) only the slider, moving it relative to the suspension and load beam, or move only the read-write element relative to the slider body. A third stage actuator may be used in conjunction with a first stage actuator (e.g., VCM) and a second stage actuator (e.g., milli-actuator) for more accurate head positioning. Piezoelectric (PZT) based and capacitive micro-machined transducers are two types of microactuators that have been proposed for use with HDD sliders.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DESCRIPTION

Approaches to a piezoelectric (PZT)-based device are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Generally, the piezoelectric effect refers to the ability of certain materials to generate an electric charge in response to applied mechanical stress and, conversely, generate stress when an electric field is applied, which can operate to expand and compress the material via manipulation of the underlying crystalline structure of the material. Hence, depending on the orientation of the polarization of the material and the applied voltage, a piezoelectric actuator may be configured to expand or contract when an electric field is applied, i.e., when actuated. A typical manufactured/synthetic type of piezoelectric material is a ceramic, lead zirconate titanate ($Pb[Zr_xTi_{1-x}]O_3$ with $0 \leq x \leq 1$), which is commonly referred to as "PZT". According to embodiments throughout this description, the material used for each of the described piezoelectric actuators is PZT. However, each embodiment is not necessarily limited to that specific material, as other piezoelectric materials could be utilized.

A piezoelectric (PZT) microactuator (MA), in the context of a hard disk drive, is designed for rotating a slider by way of PZT motion. A PZT MA may be located at the flexure and utilized to drive the slider via the flexure structure. Thus, such a microactuator may have the potential problem of flexure mode excitation by the PZT. From the viewpoint of a servo system, an excited flexure mode is considerably difficult to control and often relies on a notch filter. The electrodes of a multilayer PZT cause a difference of active lengths of adjacent PZT layers and an out-of-plane force(s) that affects the flexure mode of vibration. The design of a multilayer PZT structure may enable the control of such out-of-plane force(s) and of the flexure mode, however a single-layer PZT may be desirable in some situations because of lower cost.

Out-of-Plane Motion of PZT Microactuator

Figure 2A:
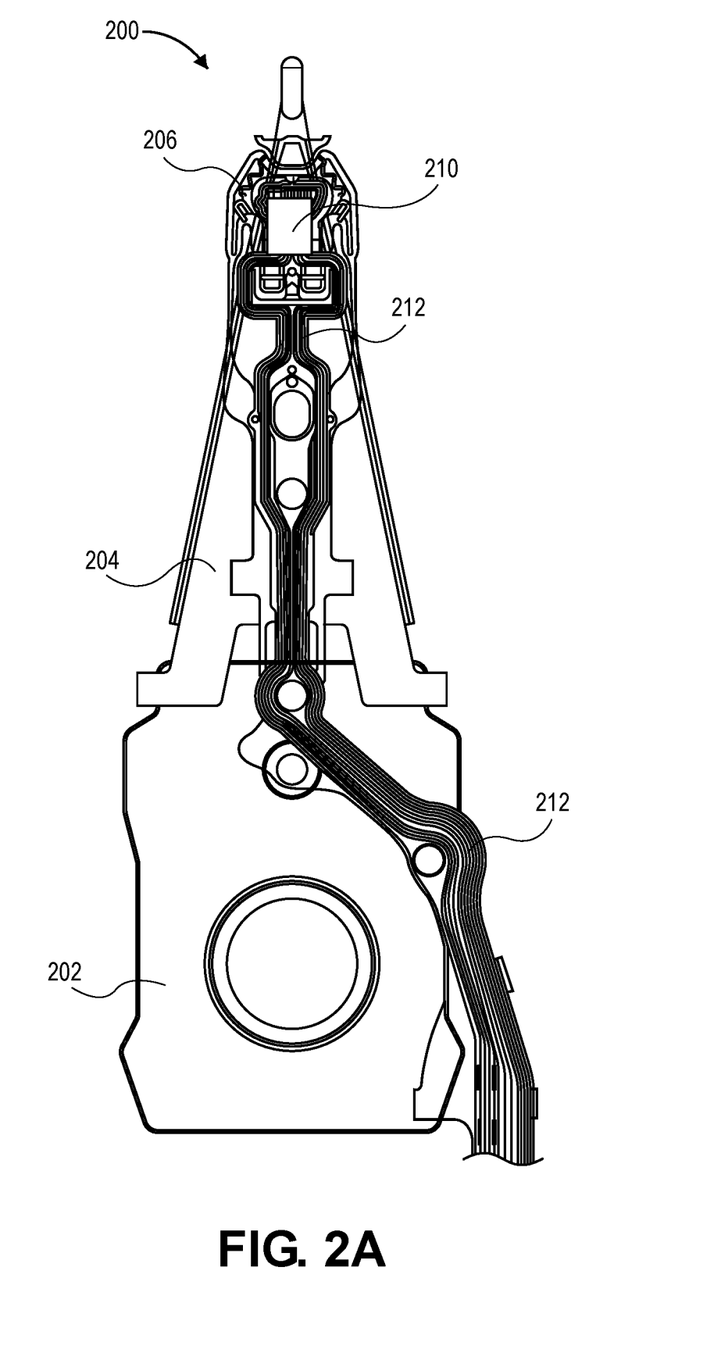
FIG. 2A is a plan view illustrating a hard disk drive (HDD) suspension, according to an embodiment.
Figure 2B:
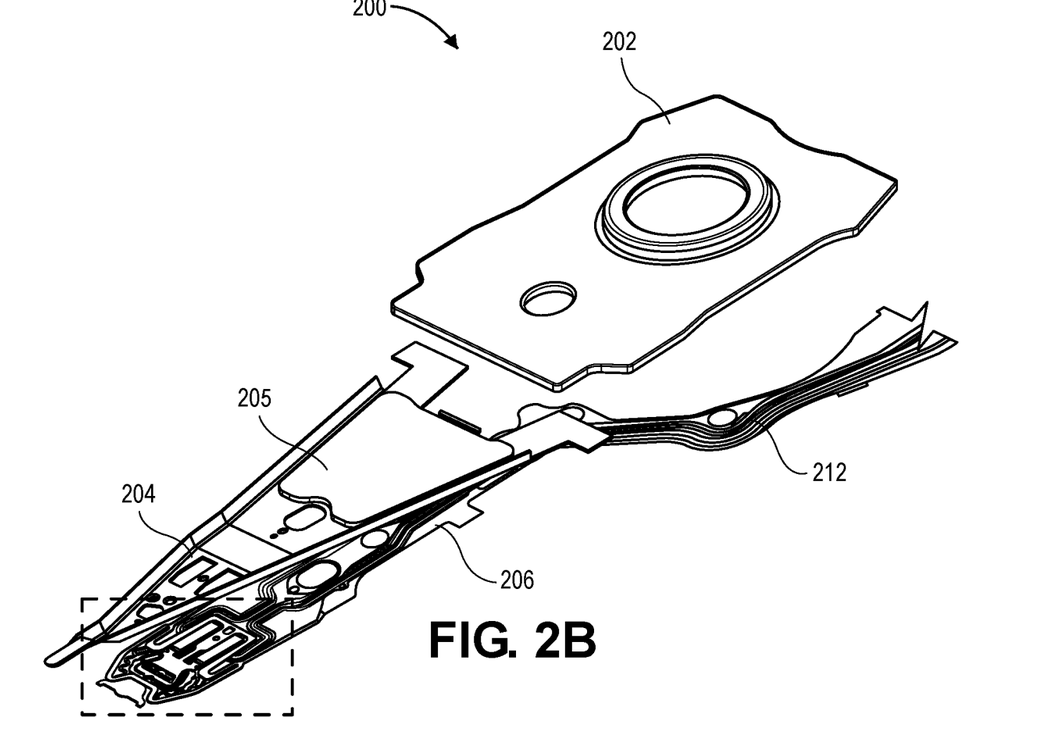
FIG. 2B is an exploded view illustrating the suspension of FIG. 2A, according to an embodiment.
Figure 2C:
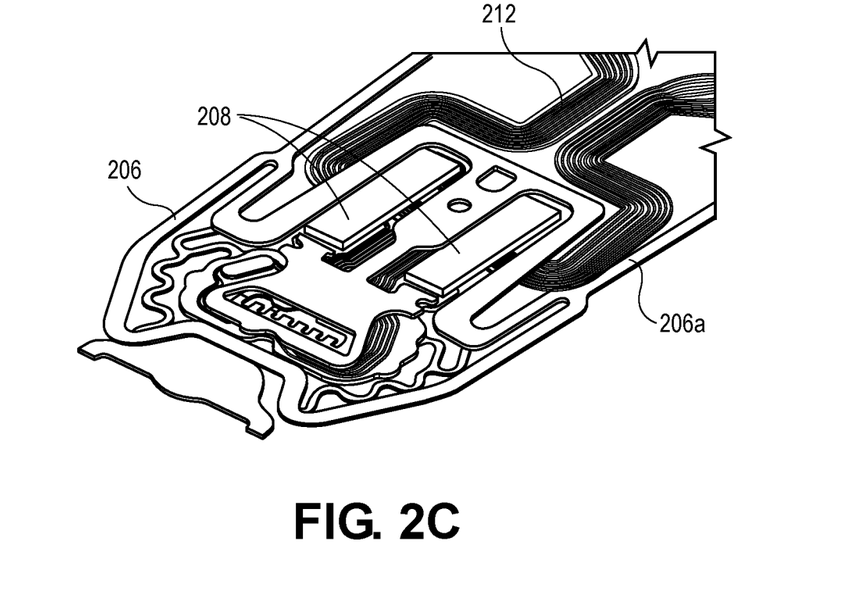
FIG. 2C is a perspective view illustrating a flexure and piezoelectric (PZT) microactuator of the suspension of FIG. 2A, according to an embodiment.

FIG. 2A is a plan view illustrating a hard disk drive (HDD) suspension, FIG. 2B is an exploded view illustrating the suspension of FIG. 2A, and FIG. 2C is a perspective view illustrating a flexure and piezoelectric (PZT) microactuator of the suspension of FIG. 2A (magnified view of dashed box of FIG. 2B), all according to an embodiment.

Suspension 200 comprises a baseplate 202 (typically swaged to an actuator arm, such as arm 132 of FIG. 1, not shown here), to which is coupled a load beam 204, a flexure 206 housing a microactuator 208 for moving/rotating a head slider 210, and an electrical trace 212 for carrying electrical signals such as between the head slider 210, microactuator 208, and some other relatively remote electrical/electronic component such as a preamp, channel electronics, and the like. Furthermore, a suspension such as suspension 200 may further comprise a damper 205 structure, for managing suspension dynamic modes.

According to an embodiment, the microactuator 208 is a piezoelectric (PZT)-based microactuator, where the PZT element of microactuator 208 comprises active electrodes on each of its top and bottom surfaces. When voltage is applied to the electrodes, an electric field in the vertical direction (normal to the PZT material) causes the PZT to strain. Thus, a PZT element can contract or extend in its longitudinal direction by voltage applied to its electrodes. Note that the PZT microactuator 208 and the slider 210 are configured on opposite sides of the flexure 206, allowing the PZTs to be closer to the slider 210, e.g., to increase resonance frequency with small PZTs.

Figure 3A:
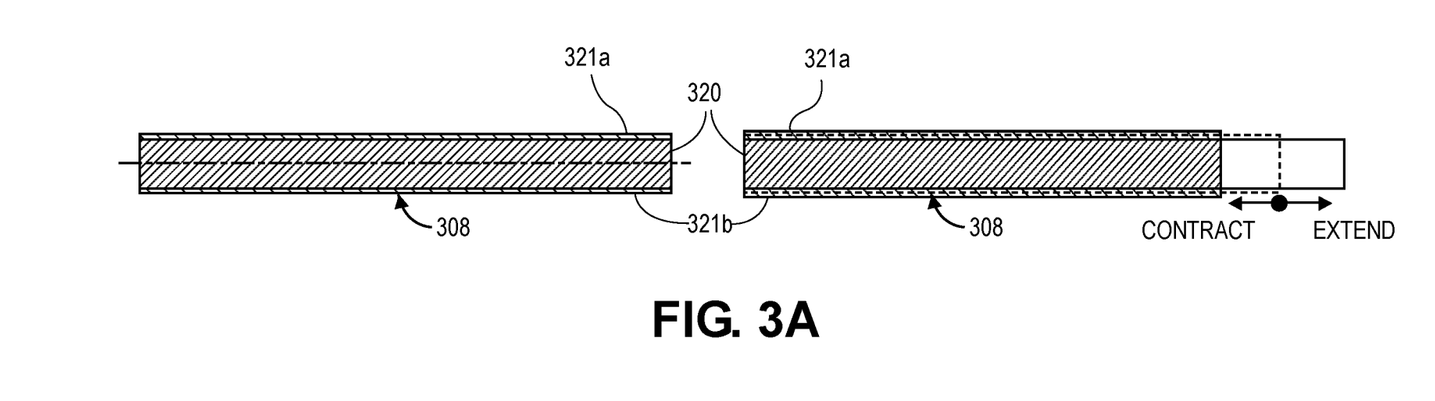
FIG. 3A is a side view diagram illustrating an ideal PZT microactuator.
Figure 3B:
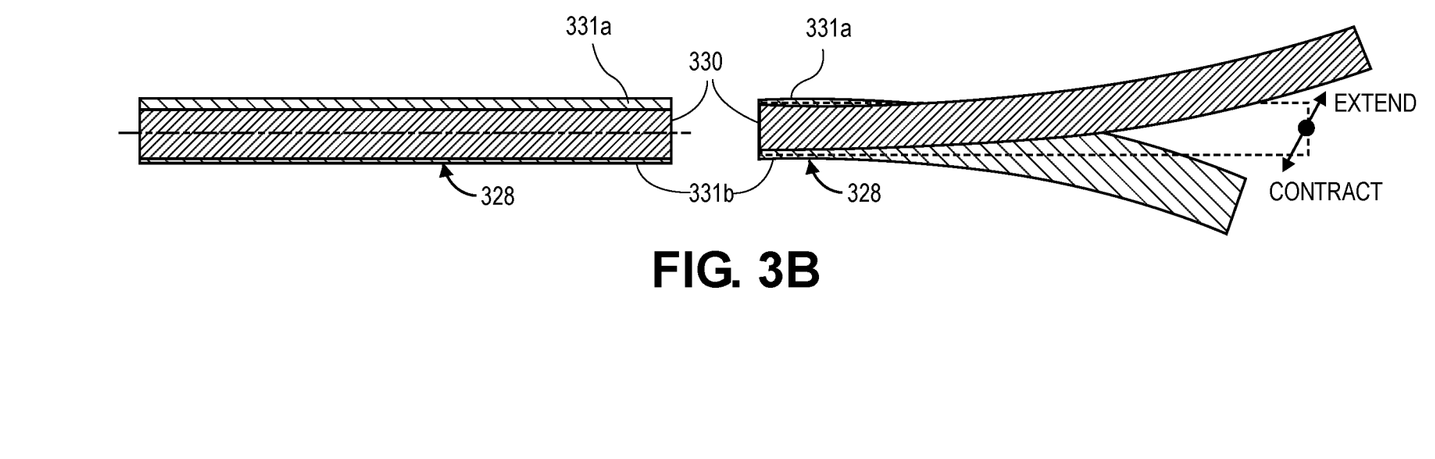
FIG. 3B is a side view diagram illustrating a PZT microactuator having random varying electrodes.

FIG. 3A is a side view diagram illustrating an ideal PZT microactuator. PZT microactuator 308 is illustrated comprising PZT material, i.e., PZT element 320, over the surfaces of which is an electrode 321a (top, here) and an electrode 321b (bottom, here). If one is fortunate enough to manufacture and form the top and bottom electrodes 321a, 321b so as to precisely match structurally/dimensionally (i.e., with an "ideal" PZT microactuator), then such a symmetrical PZT microactuator 308, generally, and its constituent PZT element 320, particularly, moves (contracts/extends) linearly in an in-plane direction, as shown. However, manufacturing variations of parts can include a difference between the top and bottom electrode thicknesses, which causes bending that is considered random (rather than controlled) based on the variation of thicknesses, i.e., causing the PZT element to move in an out-of-plane direction. FIG. 3B is a side view diagram illustrating a PZT microactuator having random varying electrodes. PZT microactuator 328 is illustrated comprising PZT material, i.e., PZT element 330, over the surfaces of which is an electrode 331a (top, here) and an electrode 331b (bottom, here), where one electrode is randomly thicker than the other electrode, such as due to relatively random (e.g., effectively uncontrollable) but significant manufacturing limitations and variations. For example, a thicker top electrode 331a can result in a relatively stiffer top side and, consequently, the PZT element 330 moves or bends upward when extending and moves or bends downward when contracting, as shown. Similarly, a thicker bottom electrode 321b can result in a relatively stiffer bottom side and, consequently, the PZT element 330 moves or bends downward when extending and moves or bends upward when contracting (the opposite of as shown in FIG. 3B).

Z-Height Effect on PZT Microactuator Behavior

Figure 4A:
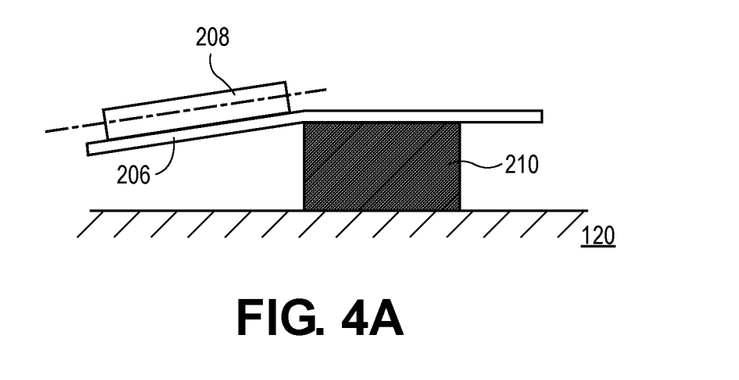
FIG. 4A is a side view diagram illustrating a PZT microactuator in a low z-height configuration.
Figure 4B:
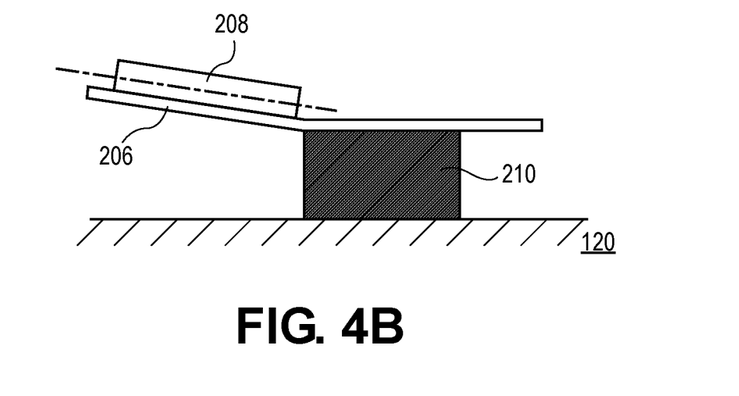
FIG. 4B is a side view diagram illustrating a PZT microactuator in a high z-height configuration.

An operational HDD can experience variations of the z-height between the actuator arm (see, e.g., arm 132 of FIG. 1) and the corresponding recording disk (see, e.g., recording medium 120 of FIG. 1), generally where the head gimbal assembly (HGA) is gimbally supported (e.g., about a dimple). FIG. 4A is a side view diagram illustrating a PZT microactuator in a low z-height configuration, and FIG. 4B is a side view diagram illustrating a PZT microactuator in a high z-height configuration.

When the arm and the disk become farther apart, that is considered a high z-height case (e.g., FIG. 4B) and the PZT microactuator 208 will be relatively far from the disk 120 and will turn downward at the slider 210 end. With reference back to FIGS. 2A-2C, the flexure 206 comprises an outrigger 206a portion and a portion of the trace 212, supporting the PZT microactuator 208 and the corresponding slider 210.

The flexure 206 is mechanically coupled with the load beam 204 and the baseplate 202, and the slider 210 flies above the disk 120, supported by a dimple. With a high z-height, the baseplate 202 goes up and the load beam 204 moves around the dimple. Thus, the outrigger 206a and the trace 212 move up with the load beam 204, which slopes the PZT microactuator 208 downward. Likewise, when the arm and the disk get close, that is considered a low z-height case (e.g., FIG. 4A) and the PZT microactuator 208 will come relatively close to the disk 120 and will turn upward at the slider 210 end because the PZT microactuator 208 again moves with the outrigger 206a and the trace 212. That is, with a low z-height, the baseplate 202 goes down and the load beam 204 moves around the dimple. Thus, the outrigger 206a and the trace 212 move down with the load beam 204, which slopes the PZT microactuator 208 upward.

High Performance PZT Microactuator

In view of the foregoing, one can appreciate that the direction of PZT motion can be readily and often undesirably affected by variations of electrode thickness and z-height. Furthermore, the direction of out-of-plane forces by the PZT can be easily flipped, which causes phase variations of flexure vibration by way of PZT excitation. A microactuator such as microactuator 208 (see, e.g., FIG. 2C) is evaluated based on the displacement of the corresponding slider such as head slider 210 (see, e.g., FIG. 2A), and vibration of the flexure 206 (see, e.g., FIGS. 2A-2C) affects that. Based on the foregoing examples, a thick top electrode 331a (FIG. 3B) and low z-height (e.g., FIG. 4A) cases will make the direction of movement of the PZT microactuator 208, 328 turn away from the slider 210, and transfer characteristics may be degraded. Hence, a thicker bottom electrode 331b (FIG. 3B) would be expected to improve the direction of the movement of the PZT microactuator 208, 328 close to the slider 210 in the low z-height case. Notably, generally the design of different thicknesses for the top and the bottom electrodes enables the offsetting of the direction of movement of a PZT microactuator such as PZT microactuator 208 to mitigate variations of PZT movement based on z-height, according to an embodiment.

Figure 5:
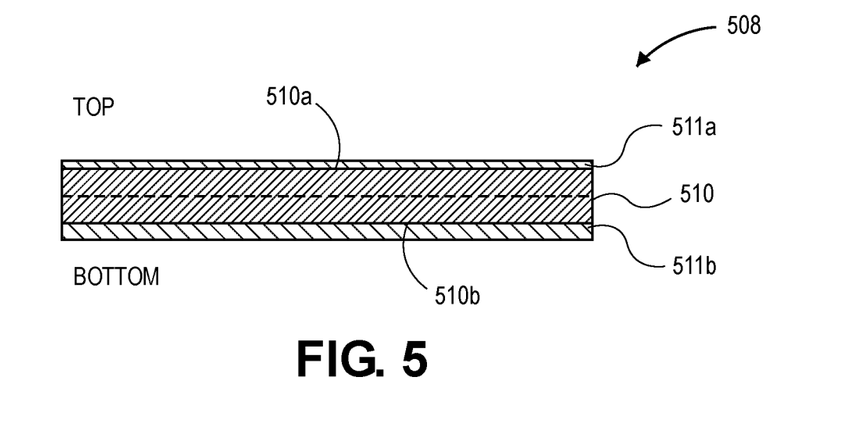
FIG. 5 is a side view diagram illustrating a PZT microactuator having differentially thick electrodes, according to an embodiment.

FIG. 5 is a side view diagram illustrating a PZT microactuator having differentially thick electrodes, according to an embodiment. Note that the opposing terms "top" and "bottom, "over" and "under". "above" and "below", "upper" and "lower", and the like, if used herein are used relatively but arbitrarily and not in an absolute sense because PZT microactuator 508 does not necessarily have a true top or bottom. With reference to FIG. 5, the side view of PZT microactuator 508 shows that one or more s of poled PZT material 510 collectively have a top surface 510a and an opposing bottom surface 510b. The top surface 510a of PZT material 510 is covered (e.g., coated or deposited) with a top, or first, conductive electrode layer 511a. Similarly, the bottom surface 510b of PZT material 510 is covered (e.g., coated or deposited) with a bottom, or second, conductive electrode layer 511b. Each of the electrode layer 511a and the electrode layer 511b is electrically coupled to the respective top surface 510a and bottom surface 510b of PZT material 510, to drive actuation of the PZT microactuator 508.

Notably and according to an embodiment, the electrode layer 511a (e.g., a "first electrode layer") has a first thickness and the electrode layer 511b (e.g., a "second electrode layer") has a second thickness that is different from the first thickness. Stated otherwise, the first and second electrode layers 511a, 511b are of intentionally different particular thicknesses, rather than of uncontrolled randomly varying thicknesses as described in reference to FIG. 3B for example. Note that in FIG. 5 the depiction of electrode layer 511b being thicker than the electrode layer 511a is arbitrary and for example purposes. Thus, to reiterate, the design of different thicknesses for the top and the bottom electrode layers 511a, 511b enables the offsetting of the direction of movement of the PZT microactuator 508 to mitigate variations of PZT movement based on z-height and, likewise, to mitigate phase variations corresponding to vibration of the flexure 206 (FIGS. 2A-2C). For example, a phase variation may correspond to a time lag of output signal from input signal, such as with a PZT voltage as input and the corresponding slider displacement as output. In that scenario, a phase variation would affect system performance, as a delay. Furthermore, in some cases the phase can be in lead side, whereby the output phase leads the input phase. In that scenario, a controlled or managed PZT motion can be utilized to enable such a lead side phase variation, which would be expected to reduce delay and enable better system performance. Generally, a wide variation of phase in both lead and lag sides is not desirable in a PZT device or microactuator scenario, whereas a small variation of phase in one side is considered better to control.

The number of layers of the poled PZT material 510 may vary from implementation to implementation. Thus, according to an embodiment the one or more layers of PZT material 510 comprise a plurality of layers of poled PZT material 510 and, according to an alternative embodiment the one or more layers of PZT material 510 consists of a single layer of poled PZT material 510. According to an embodiment, both of the first electrode layer 511a and the second electrode layer 511b are "active" actuation electrode layers by way of being electrically connected to an electrical source (such as a power or drive circuit, as known in the art), thereby being configured to drive actuation of the poled, active PZT material 510 to extend and contract in the in-plane direction. Each or any of the PZT material 510 layer(s) may be made "active" by poling a given PZT layer and by configuring the corresponding electrode layer(s) 511a, 511b such that the PZT layer is subjected to an electric field when the PZT microactuator 508 is actuated, e.g., when voltage is applied to or across the electrode layers 511a, 511b to cause the PZT material 510 to strain. A combination of inactive and active PZT layers is inapplicable to controlling bending motion of a single-layer PZT microactuator embodiment. However, a combination of "tuned-thickness" top and bottom electrodes, e.g., first and second electrode layers 511a, 511b, can be utilized to control bending motion of a single-layer PZT microactuator (e.g., a single-layer embodiment of PZT microactuator 508). Additionally, with a multilayer PZT microactuator embodiment with all PZT layers active, a combination of "tuned-thickness" top and bottom electrodes can be utilized to control bending motion of the multilayer PZT microactuator (e.g., a multilayer embodiment of PZT microactuator 508).

Not only can intentionally differential thicknesses of the electrode layers 511a, 511b be configured and implemented to control out-of-plane motion (e.g., bending) of the PZT microactuator 508, but additionally, according to an embodiment the electrode layers may be formed of different materials having different Young's moduli. That is, the first electrode layer 511a may be formed from a first material having a first Young's modulus and the second electrode layer 511b formed from a second material having a second Young's modulus different from the first Young's modulus.

Furthermore and according to an embodiment, each electrode layer may be formed by a different manufacturing process to provide different respective mechanical properties with different materials and/or thicknesses. That is, the first electrode layer 511a may be formed from a first process, such as a sputtering process, and the second electrode layer 511b formed from a second different process, such as a screen printing process, and vice versa. The use of each of the various embodiments described herein for controlling the bending motion of PZT microactuator, such as different electrode thicknesses, materials, and/or manufacturing processes, may be implemented alone or in combinations, and still fall within the intended scope of the claimed embodiments.

Patterned Electrodes

Figure 6A:
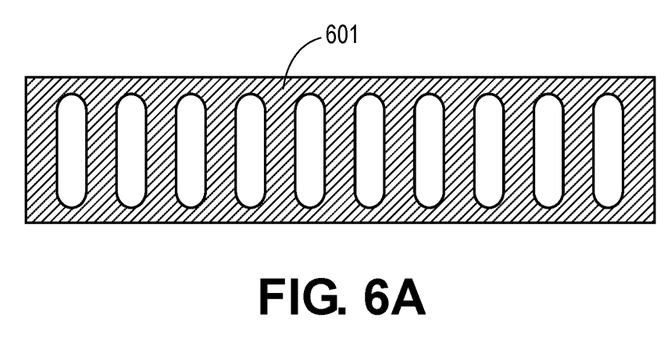
FIG. 6A is a plan view illustrating a first patterned electrode, according to an embodiment.
Figure 6B:
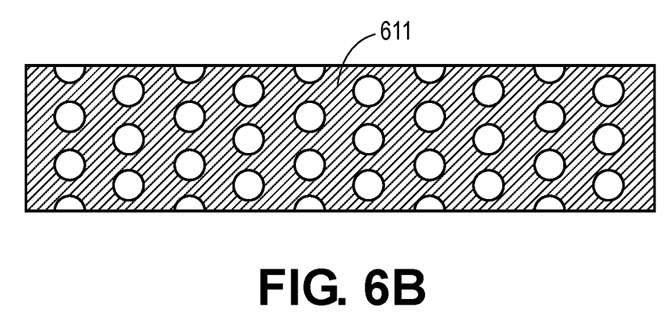
FIG. 6B is a plan view illustrating a second patterned electrode, according to an embodiment.
Figure 6C:
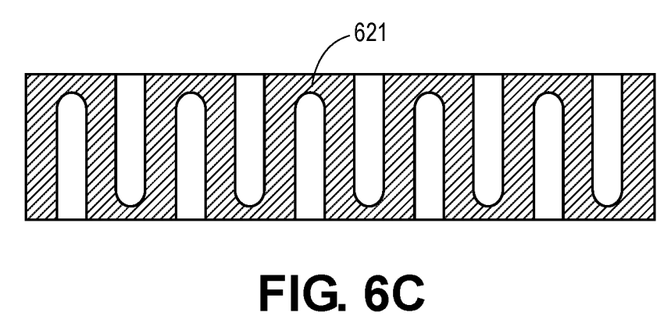
FIG. 6C is a plan view illustrating a third patterned electrode, according to an embodiment.

FIG. 6A is a plan view illustrating a first patterned electrode, FIG. 6B is a plan view illustrating a second patterned electrode, and FIG. 6C is a plan view illustrating a third patterned electrode, all according to embodiments. FIG. 6A illustrates an exemplary patterned electrode layer 601, according to an embodiment. FIG. 6B illustrates an exemplary patterned electrode layer 611, according to an embodiment. FIG. 6C illustrates an exemplary patterned electrode layer 621, according to an embodiment. These non-limiting examples illustrated in FIGS. 6A-6C include differentially formed top and bottom electrodes by patterning, where one of the top or bottom electrode layers is formed generally similarly to as shown and the other electrode layer is not patterned. Use of a patterned electrode will make one side less stiff and cause out-of-plane motion of PZT element. Hence, in a way similar to the differential thickness electrode embodiments described elsewhere herein, patterned electrode designs can enable the offsetting of the direction of movement of a PZT microactuator such as PZT microactuator 508 (FIG. 5) to mitigate variations of PZT movement based on z-height.

Method of Manufacturing a Piezoelectric Device

Figure 7:
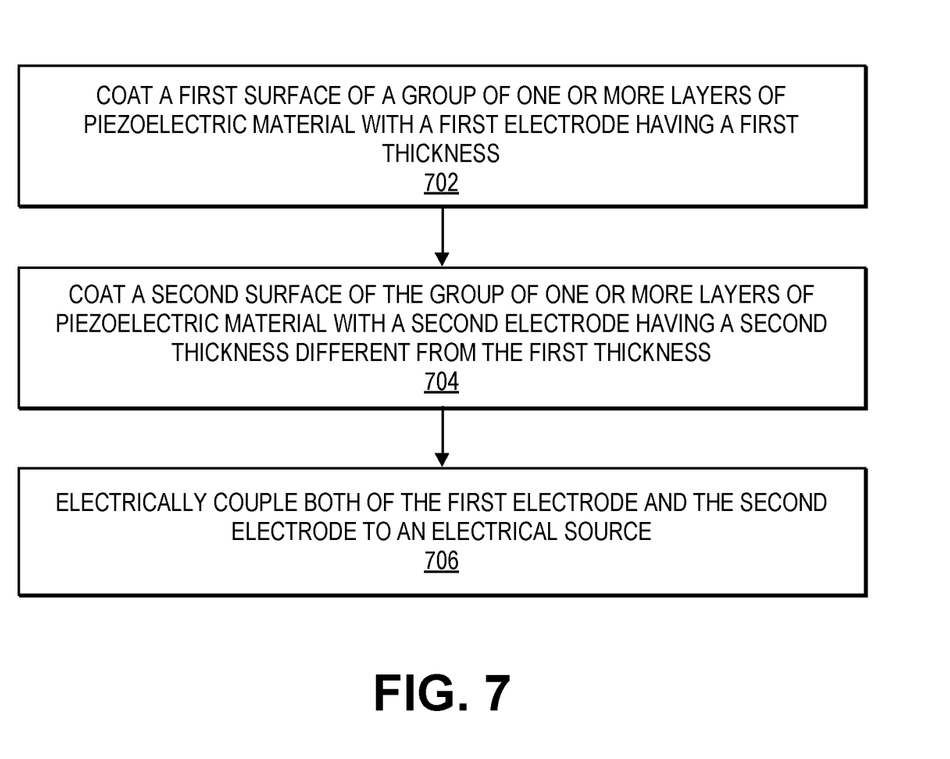
FIG. 7 is a flow diagram illustrating a method of manufacturing a PZT device, according to an embodiment.

FIG. 7 is a flow diagram illustrating a method of manufacturing a PZT device, according to an embodiment. For example, the method of FIG. 7 may be used to manufacture a piezoelectric microactuator, such as PZT microactuator 508 (FIG. 5), for a hard disk drive (HDD) such as HDD 100 of FIG. 1.

At block 702, a first surface of a group of one or more layers of piezoelectric material is coated with a first electrode having a first thickness. For example, one side of PZT material 510 (FIG. 5) of PZT actuator 508 is coated at least in part with electrode layer 511a.

At block 704, a second surface of the group of one or more layers of piezoelectric material is coated with a second electrode having a second thickness that is different from the first thickness. For example, the other side of PZT material 510 of PZT actuator 508 is coated at least in part with electrode layer 511b (FIG. 5).

At block 706, both of the first electrode and the second electrode are electrically coupled to an electrical (power) source. For example, electrode layer 511a is electrically coupled to a power driver circuit, within the knowledge in the art, and electrode layer 511b is electrically coupled to a power driver circuit, thereby activating, making active, enabling actuation of, the group of one or more layers of PZT material 510.

Thus, control of out-of-plane forces of a PZT element(s) for both single-layer and multilayer PZT devices is enabled, where a single-layer PZT device has a simpler structure than a multilayer PZT device and, therefore, enables a lower cost. Study of flexure vibration modes and phases, relative to varying z-heights, enables the design of a PZT microactuator having certain phase characteristics. Consequently, a combination of different thicknesses of the top and bottom electrodes of single and multi layer PZT devices enables the design of a PZT microactuator that mitigates phase variation of flexure vibration (which may enable the removal of the aforementioned notch filter and, thus, a lower cost design).

Physical Description of an Illustrative Operating Context

Embodiments may be used in the context of a piezoelectric (PZT)-based actuating device, such as a PZT-based microactuator for a hard disk drive (HDD). Thus, in accordance with an embodiment, a plan view illustrating a conventional HDD 100 is shown in FIG. 1 to aid in describing how a conventional HDD typically functions.

Figure 1:
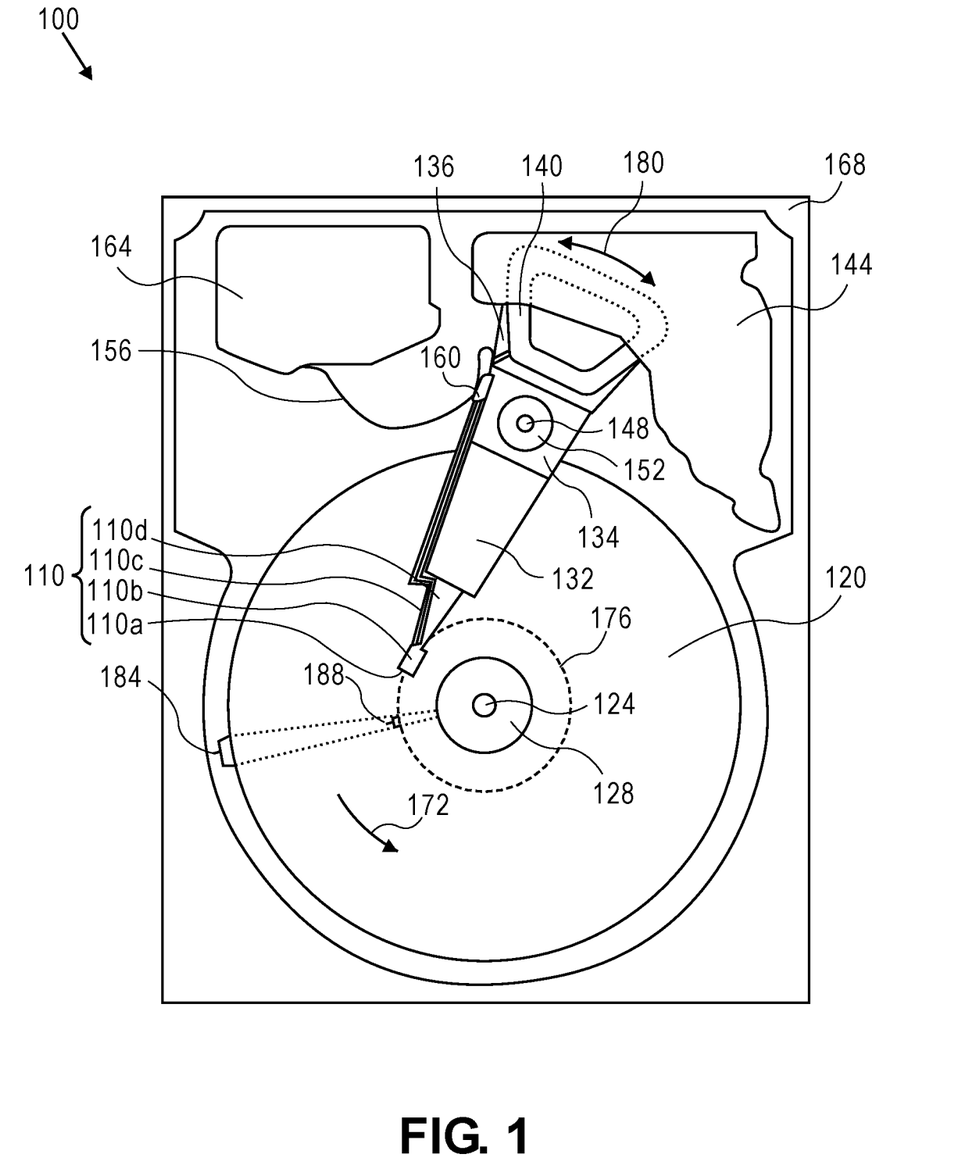
FIG. 1 is a plan view illustrating a hard disk drive, according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM, or "voice coil actuator") that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM, and a write signal to and a read signal from the head 110a) are transmitted from an electrical power source by a flexible cable assembly (FCA) 156 (or "flex cable"), also at times referred to as a flexible printed circuit (FPC). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium or hydrogen for non-limiting examples, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A piezoelectric device comprising:
   one or more layers of poled piezoelectric material collectively having a top surface and an opposing bottom surface;
   a first electrode layer electrically coupled with the top surface and with an electrical source; and
   a second electrode layer electrically coupled with the bottom surface and with the electrical source;
   wherein at least one of the first electrode layer and the second electrode layer is formed as a patterned electrode comprising a pattern of material voids, to generate a corresponding electrode layer stiffness different from the other electrode layer stiffness.

2. The piezoelectric device of claim 1, wherein the one or more layers of piezoelectric material comprise a plurality of layers of poled piezoelectric material.

3. The piezoelectric device of claim 1, wherein the one or more layers of piezoelectric material consists of a single layer of poled piezoelectric material.

4. The piezoelectric device of claim 1, wherein the first electrode layer is formed from a first material having a first Young's modulus and the second electrode layer is formed from a second material having a second Young's modulus different from the first Young's modulus.

5. The piezoelectric device of claim 1, wherein the first electrode layer is formed using a sputtering process to generate a corresponding first electrode layer stiffness and the second electrode layer is formed using a screen printing process to generate a corresponding second electrode layer stiffness different from the first electrode layer stiffness.

6. A hard disk drive comprising the piezoelectric device of claim 1.

7. A hard disk drive (HDD) comprising:
one or more recording disk media rotatably mounted on a spindle;
a head slider coupled with an actuator arm and housing a read-write transducer configured to read from and to write to a recording disk medium of the one or more recording disk media;
a voice coil actuator configured to move the head slider to access portions of the recording disk medium; and
a microactuator separate from and mechanically linked to the head slider via a flexure of a suspension assembly, to drive the head slider to rotate the head slider to access portions of the recording disk medium, wherein the microactuator comprises:
one or more layers of poled piezoelectric material collectively having a top surface and an opposing bottom surface,
a first electrode layer electrically coupled with the top surface and with a microactuator drive circuit and having a first thickness, and
a second electrode layer electrically coupled with the bottom surface and with the microactuator drive circuit and having a second thickness different from the first thickness;
wherein the different first and second thicknesses operate to control a direction of operational bending of the microactuator near the head slider to offset a slope of the microactuator that corresponds to a z-height of the suspension assembly relative to one of the one or more recording disk media.

8. The HDD of claim 7, wherein the one or more layers of piezoelectric material comprise a plurality of layers of poled piezoelectric material.

9. The HDD of claim 7, wherein the one or more layers of piezoelectric material consists of a single layer of poled piezoelectric material.

10. The HDD of claim 7, further comprising:
the microactuator drive circuit configured to apply drive voltage to both of the first electrode layer and the second electrode layer to drive the poled piezoelectric material to extend and contract.

11. The HDD of claim 7, wherein the first electrode layer is formed from a first material having a first Young's modulus and the second electrode layer is formed from a second material having a second Young's modulus different from the first Young's modulus.

12. The HDD of claim 7, wherein the first electrode layer is formed using a screen printing process to generate a corresponding first electrode layer stiffness and the second electrode layer is formed using a sputtering process to generate a corresponding second electrode layer stiffness different from the first electrode layer stiffness.

13. The HDD of claim 7, wherein at least one of the first electrode layer and the second electrode layer is formed as a patterned electrode comprising a pattern of material voids, to generate a corresponding electrode layer stiffness different from the other electrode layer stiffness.

14. The HDD of claim 7, wherein the first and second thicknesses are collectively configured to mitigate variation of undesired out-of-plane motion associated with operational variations in z-height between the actuator arm and the recording disk medium.

15. A method of manufacturing a piezoelectric microactuator for a hard disk drive, the method comprising:
coating a first surface of a group of one or more layers of poled piezoelectric material with a first electrode;
coating a second surface of the group of one or more layers of poled piezoelectric material with a second electrode; and
electrically coupling both of the first electrode and the second electrode to an electrical source;
wherein at least one of the coating the first surface and the coating the second surface includes forming a patterned electrode comprising a pattern of material voids, to generate a corresponding electrode stiffness different from the other electrode stiffness.

16. The method of claim 15, wherein the first electrode is formed from a first material having a first Young's modulus and the second electrode is formed from a second material having a second Young's modulus different from the first Young's modulus.

17. A system comprising:
a piezoelectric microactuator comprising one or more layers of poled piezoelectric material collectively having a top surface and an opposing bottom surface and mechanically-coupled to a head slider via a flexure; and
means for controlling a bending motion of the piezoelectric microactuator to offset an effect that an operational slope of the piezoelectric microactuator would otherwise have on the head slider by mitigating phase variation of vibration associated with the flexure.

18. A piezoelectric device comprising:
one or more layers of poled piezoelectric material collectively having a top surface and an opposing bottom surface;
a first electrode layer electrically coupled with the top surface and with an electrical source and formed using a sputtering process to generate a corresponding first electrode layer stiffness; and
a second electrode layer electrically coupled with the bottom surface and with the electrical source and formed using a screen printing process to generate a corresponding second electrode layer stiffness different from the first electrode layer stiffness.

* * * * *